(12) United States Patent
Perera (10) Patent No.: US 10,194,505 B1
(45) Date of Patent: Jan. 29, 2019

(54) AUDIO BUS LIGHTING CONTROL

(71) Applicant: Harman International Industries, Incorporated, Stamford, CT (US)

(72) Inventor: Colombathanthrige Sanda Viraga Perera, Royal Oak, MI (US)

(73) Assignee: Harman International Industries, Incorporated, Stamford, CT (US)

(*) Notice: Subject to any disclaimer, the term of this patent is extended or adjusted under 35 U.S.C. 154(b) by 0 days.

(21) Appl. No.: 15/826,471

(22) Filed: Nov. 29, 2017

(51) Int. Cl.
| H05B 37/02 | (2006.01) |
| H05B 33/08 | (2006.01) |
| B60Q 3/80 | (2017.01) |
| B60Q 3/18 | (2017.01) |
| B60Q 3/16 | (2017.01) |

(52) U.S. Cl.
CPC .......... *H05B 37/0236* (2013.01); *B60Q 3/16* (2017.02); *B60Q 3/18* (2017.02); *B60Q 3/80* (2017.02); *H05B 33/0872* (2013.01)

(58) Field of Classification Search
CPC .......... B60Q 1/1423; B60Q 1/52; B60Q 3/16; B60Q 3/18; B60Q 5/005; G01R 31/007; H05B 37/0272; H05B 33/0842; H05B 33/0845; H05B 33/0854; H05B 33/0872; H05B 37/0236; H05B 37/0254; B60R 16/037; H04M 2250/12
See application file for complete search history.

(56) References Cited

U.S. PATENT DOCUMENTS

| 7,228,190 | B2* | 6/2007 | Dowling | A63J 17/00 340/815.46 |
| 2016/0133135 | A1* | 5/2016 | Iliev | G08G 1/162 340/903 |
| 2016/0345405 | A1* | 11/2016 | Vigen | H05B 37/0236 |
| 2017/0171498 | A1* | 6/2017 | Ogi | H04N 5/907 |

FOREIGN PATENT DOCUMENTS

| KR | 20090013139 U | * 12/2009 |
| KR | 200467677 Y1 | * 6/2013 |

* cited by examiner

*Primary Examiner* — Vibol Tan
(74) *Attorney, Agent, or Firm* — Gordon & Rees LLP (57) ABSTRACT

The present disclosure relates to systems, devices and methods for lighting control by an audio bus lighting control device. In one embodiment, a method includes receiving audio bus data generated by a source in a vehicle, and generating a lighting control signal for at least one lighting element of the vehicle based on the audio bus data. The method also includes controlling operation of the at least one lighting element of the vehicle based on the lighting control signal. According to another embodiment, a lighting control device is provided including a transceiver for a vehicle audio bus, a controller and at least one lighting unit.

20 Claims, 5 Drawing Sheets

AUDIO BUS LIGHTING CONTROL

FIELD

The present disclosure relates to systems, methods and devices for lighting control, and more particularly to an audio bus lighting control device, processes and systems for vehicles.

BACKGROUND

Many types of lighting control exist. While some aspects of lighting elements are similar across different applications, lighting control for certain applications is often specifically tailored. Different applications of lighting usually require application specific controllers and specific hardware. By way of example, lighting elements and controllers for residential use are very different than lighting control in other applications, such as vehicles. Residential lighting elements usually are turned on or off by a switch and the lighting element is a single color element configured to provide light for residential use. In addition, some applications of lighting control impose specific requirements on controllability, power requirements, etc.

Conventional vehicle configurations include a vehicle electrical system which generally controls lighting elements in the vehicle instrument panel, vehicle driving lights and safety lighting for a passenger dome light and passenger doors. These lighting elements typically involve a single lighting unit with a light single color. While some manufacturers allow for lights to gradually dim or brightness settings, these lighting elements and control are typically limited to an on or off state. In addition, these elements require their own electrical backbone in the vehicle. These conventional configurations would not allow for lighting control beyond simple illumination and on/off operation. There exists a desire for lighting and control of lighting elements in vehicles, separate from overhead or reading light elements that are activated by a switch or door opening/closing. There exists a need and a desire for control and lighting systems that can provide advanced lighting control within a vehicle.

BRIEF SUMMARY OF THE EMBODIMENTS

Disclosed and claimed herein are methods, devices and systems for vehicle control. One embodiment is directed to a method for lighting control by an audio bus lighting control device. The method includes receiving, by a lighting control device, audio bus data generated by a source in a vehicle and generating, by a controller of the lighting control device, a lighting control signal for at least one lighting element of the vehicle based on the audio bus data. The method also includes controlling, by a switching unit of the lighting control device, operation of the at least one lighting element of the vehicle based on the lighting control signal.

In one embodiment, receiving the audio bus data includes receiving time varying color information on at least one audio channel of the audio bus.

In one embodiment, receiving the audio bus data includes receiving at least one channel of an audio signal.

In one embodiment, generating the lighting control signal includes generating pulse width modulated output signals for each of a red, green and blue output to the lighting panel.

In one embodiment, generating the lighting control signal includes decoding the lighting control signal and outputting control information for at least one color parameter for the lighting panel.

In one embodiment, generating the lighting control signal includes selecting a preset lighting setting associated with one of a plurality of mood settings, wherein the preset light setting is selected in response to at least one of source type, audio class and audio sound profile.

In one embodiment, controlling operation includes controlling at least one of luminance, color, duration of illumination and rate of lighting element change for a lighting panel.

In one embodiment, controlling operation includes controlling a plurality of lighting panels in association with at least one predefined mood setting.

In one embodiment, the method also includes detecting a vehicle event by the lighting control device and updating operation of the at least one lighting element of the vehicle based on the lighting control signal in response to the vehicle event.

In one embodiment, the vehicle event is at least one of an incoming communication, vehicle operating state, vehicle status indicator and change in source of audio bus data.

Another embodiment is directed to an audio bus lighting control device including an input, an output, and a controller coupled to the input and output. The controller is configured to receive audio bus data generated by a source in a vehicle and generate a lighting control signal for at least one lighting element of the vehicle based on the audio bus data. The controller is also configured to control operation of the at least one lighting element of the vehicle based on the lighting control signal.

Another embodiment is directed to a system including at least one lighting unit and an audio bus lighting control device coupled to the lighting unit. The audio bus lighting control device is configured to receive audio bus data generated by a source in a vehicle and generate a lighting control signal for at least one lighting element of the lighting unit in the vehicle based on the audio bus data. The audio bus lighting control device is also configured to control operation of the at least one lighting unit of the vehicle based on the lighting control signal.

Other aspects, features, and techniques will be apparent to one skilled in the relevant art in view of the following detailed description of the embodiments.

BRIEF DESCRIPTION OF THE DRAWINGS

The features, objects, and advantages of the present disclosure will become more apparent from the detailed description set forth below when taken in conjunction with the drawings in which like reference characters identify correspondingly throughout and wherein.

DETAILED DESCRIPTION OF THE EXEMPLARY EMBODIMENTS

Overview and Terminology

One aspect of the disclosure is directed to controlling lighting elements in a vehicle. Embodiments are directed to systems, methods and devices for lighting control of lighting elements based on audio bus data of the vehicle. Vehicles, such as automobiles, may be manufactured to include a plurality of lighting units in the passenger compartment which are not controlled by an audio bus, such as overhead dome lighting, door safety lights, reading lights, etc. These passenger compartment units are typically controlled by activation of a switch or opening and closing of vehicle doors. As used herein, lighting units relate to one or more lighting elements providing one or more of an ambient, accent and mood lighting effect. Lighting units as described herein may be operated separate from vehicle passenger safety or reading lights. According to one embodiment, a process is provided for controlling operation of lighting units based on audio bus data. The process may be directed to control of ambient, mood or accent lighting within a passenger compartment, including but not limited to a vehicle dashboard, vehicle console, door panels, roof panels, door sills, center console, speaker units, etc. Lighting units, such as LED panels, may including a plurality of lighting elements, wherein each lighting element of the lighting unit may be individually controlled. Lighting control signals may be generated using audio bus data generated by one or more sources in a vehicle.

Another embodiment is directed to a lighting control device configured to receive audio bus data and control at least one lighting unit of a vehicle. The lighting control device may include a controller to generate lighting control signals. In one embodiment, audio bus data includes control signals on one or more channels of the vehicles audio bus. The audio bus may be configured to carry output for one or more vehicle speakers and one or more infotainment features. In one embodiment, the audio bus may provide lighting control signal supplied by an audio processing unit (e.g., amplifier) which may be directly provided to the audio bus.

According to one embodiment, control signals of the audio bus indicate one or more of a user setting, preset color setting and color mode may be provided to a lighting control unit using an audio bus. According to another embodiment, control signals are audio signals (e.g., music, voice, broadcast programming, etc.). A lighting control unit may generate lighting control signals using audio signal data. Control settings for lighting panels may be generated by the lighting control unit and output to one or more lighting units. In addition to controlling illumination parameters and color of lighting elements to enhance passenger experience, lighting control may be employed to signal vehicle events. According to one embodiment, lighting control is directed to providing a light show/display in the cabin to provide the impression of being at a musically augmented setting, such as a performance, concert, hall, etc.

As used herein, the terms "a" or "an" shall mean one or more than one. The term "plurality" shall mean two or more than two. The term "another" is defined as a second or more. The terms "including" and/or "having" are open ended (e.g., comprising). The term "or" as used herein is to be interpreted as inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

Reference throughout this document to "one embodiment," "certain embodiments," "an embodiment," or similar term means that a particular feature, structure, or characteristic described in connection with the embodiment is included in at least one embodiment. Thus, the appearances of such phrases in various places throughout this specification are not necessarily all referring to the same embodiment. Furthermore, the particular features, structures, or characteristics may be combined in any suitable manner on one or more embodiments without limitation.

EXEMPLARY EMBODIMENTS

Figure 1:
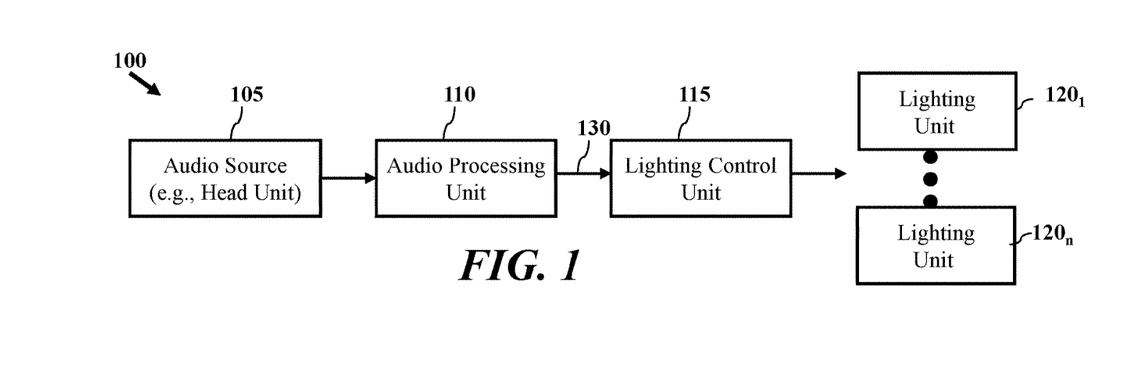
FIG. 1 depicts a graphical representation of vehicle system including an audio bus lighting control device according to one or more embodiments.

Referring now to the figures, FIG. 1 depicts a graphical representation of control by an audio bus lighting control device according to one or more embodiments. According to one embodiment, FIG. 1 shows components of vehicle 100. Vehicle 100 includes audio source 105, audio processing unit 110, lighting control unit 115 and a plurality of lighting units $120_{1-n}$. According to another embodiment, processes and configurations are provided to allow for lighting control unit 115 to control one or more of lighting units $120_{1-n}$. As will be discussed herein, at least one of audio processing unit 110 and lighting control unit 115 may be configured to control one or more of lighting units $120_{1-n}$ based on audio bus data generated by a source in the vehicle. According to another embodiment, one or more inputs or selections may detected by components of vehicle 100, such as audio source 105 and audio processing unit 110. In one embodiment, audio source 105 provides audio bus data for lighting control. According to another embodiment, audio processing unit 110 provides audio bus data for lighting control of lighting units $120_{1-n}$.

According to one embodiment, one or more forms of audio bus data may be used for lighting control. FIG. 1 depicts one embodiment including audio source 105, which may be a head unit or other vehicle source outputting data (e.g., audio data, user selections, etc.) to audio processing unit 110. Audio source 105 may include components such as a radio (e.g., terrestrial, satellite, etc.), media player, and disc player. Audio source 105 may use inputs to receive media from external devices, such as a mobile device. In certain embodiments, audio source 105 relates to a vehicle infotainment unit. In other embodiments, audio source 105 may be a component of a vehicle infotainment unit. Audio processing unit 110 may be configured to receive output of audio source 105 and generate one or more signals for components of a vehicle, such as vehicle speakers. Audio processing unit 110 may be configured to set output levels for a plurality of speakers and provide individual output to one or more speaker elements. By way of example, for a vehicle including front left, front center, front right, rear left, rear center, and rear left speakers, audio processing unit 110 may be configured to set volume and equalizer (e.g., treble, bass, etc.) for each speaker unit. According to another embodiment, audio processing unit 110 may be configured to generate output for two-way and three way speaker configurations based on output of audio source 105. According to one embodiment, output of audio processing unit 110 may be provided by one or more connections, such as an audio bus, shown as bus 130, including a plurality of channels to the various speakers of vehicle 100. Audio processing unit 110 may output audio data to one or more channels.

In some embodiments, audio source 105 and audio processing unit 110 may be a single unit. Although FIG. 1 depicts a single audio processing unit 110 and single audio source 105, it should be appreciated that a plurality of audio sources and audio processing units may supply audio bus 130 with audio bus data. Audio bus data may provide one or more channels including audio output for a plurality of vehicle speakers. According to one embodiment, audio signals provided to audio bus 130 may be employed by lighting control unit 115 to control one or more of lighting units $120_{1-n}$. According to another embodiment, an audio source 105 of vehicle 100 may output one or more control signals to audio bus 130 to signal a desired light setting for lighting units $120_{1-n}$.

In certain embodiments, audio processing unit 110 may amplify and direct audio output onto one or more channels of audio bus 130. As used herein, a channel of audio bus 130 may relate to at least one of a dedicated cable (e.g., wire, connection, etc.) and an encoding channel (e.g., PWM channel, etc.) Audio bus 130 may include a plurality of channels.

According to one embodiment, audio processing unit 110 is configured to provide audio bus data, such as control signals, to lighting control unit 115 of vehicle 100 for control of lighting units $120_{1-n}$ by way of audio bus 130. Thus, the control signals from audio processing unit 110 may be output to audio bus 130, and provided by audio bus 130 to lighting control unit 115. In that fashion, audio bus 130 may be used to carry audio signals to speaker elements and also allow for lighting control data to be provided to the audio bus 130. Benefits of the configuration of audio processing unit 110 and audio bus 130 in FIG. 1 may be providing a direct link and including one or more channels from audio processing unit 110 to lighting control unit 115. In addition, audio processing unit 110 may control and direct light output.

Audio processing unit 110 may be configured to provide control information in one or more forms. In one embodiment, audio processing unit 110 is configured to provide control information for outputting at least one color parameter or output setting for lighting units $120_{1-n}$. By way of example, the data output to audio bus 130 can include time varying color information on at least one channel (e.g., audio channel, communication channel, etc.) of the audio bus 130. In one embodiment, audio processing unit 110 provides at least one audio channel of an audio signal to audio bus 130 which is received by lighting control unit 115.

In one embodiment, audio processing unit 110 is configured to provide lighting control signals to audio bus 130 identifying a preset lighting setting associated with one of a plurality of mood settings. By way of example the preset setting may be output as an encoded signal which may be detected and un-encoded by lighting control unit 115 to control output of lighting units $120_{1-n}$. Lighting control unit 115 may generate the lighting control signals in response to preset lighting settings by generating pulse width modulated output signals for each of a red, green and blue output to lighting units $120_{1-n}$. The lighting control signals may be provided in addition to or separate from audio signals on audio bus 130. According to another embodiment, generating the lighting control signal includes decoding the lighting control signal and outputting control information for at least one color parameter for the lighting panel. Lighting control signals can be based on selected preset settings in response to at least one of source type, audio class and audio sound profile. For example, audio output generated by a mobile device connected to audio processing unit 110 may result in a different or modified lighting configuration relative to audio output associated with a radio function of audio source 105.

According to another embodiment, audio processing unit 110 is configured to control light output based on one or more vehicle events. For example, one or more light displays or settings may be activated in response to a vehicle event. During a preset lighting configuration or mood, a vehicle event may detected and result in audio processing unit 110 outputting a control signal to output a notification of the vehicle event. Audio processing unit 110 can preset a flash or series of flashes of light of the same or different colors than a current mood display in part or all of the vehicle. In some cases notifications may be localized to a vehicle operator. Detecting a vehicle event by audio processing unit 110 and updating operation of the at least one lighting element of the vehicle based on the lighting control signal may be in response to the vehicle events such as one or more of an incoming communication, vehicle operating state, vehicle status indicator and change in source of audio bus data.

In one embodiment, audio processing unit 110 controls operation of lighting units $120_{1-n}$ by controlling at least one of luminance, color, duration of illumination and rate of lighting element change for a lighting panel. According to another embodiment, control of lighting units $120_{1-n}$ is associated with a plurality of lighting panels in association with at least one predefined mood setting. In that fashion, several lighting elements may be controlled to provide a directed output of light and create/supplement a "mood" within a vehicle.

Audio processing unit 110 is configured to provide several functions and that may provide benefits over conventional lighting control. By way of example, audio processing unit 110 may be configured to communication and direct lighting operation using multiple channels of audio bus 130. In addition, audio processing unit 110 can control signals to different parts or speaker assemblies of the vehicle. Output settings of audio processing unit 110 may be based on presets allowing for selection of desired settings by way of inputs to infotainment or head unit.

According to one embodiment, lighting control unit 115 of vehicle 100 is configured to control a plurality of lighting units $120_{1-n}$ using at least one channel of audio bus 130. Lighting units $120_{1-n}$ of vehicle 100 may relate to multi-color led units including one or more lighting elements, such as a LED, LED panel, LED string, light unit in general, etc. Vehicle 100 may employ LED type lighting units $120_{1-n}$ due to reasonable cost, favorable power requirements and controllability. Vehicle 100 may employ one or more types and formats of lighting units $120_{1-n}$ such that multiple panel sizes and types may be employed in vehicle 100. References to lighting panels herein relate to a plurality of lighting elements that may be individually controlled over an audio bus. It should be appreciated that the principles of the disclosure may be applied to other types of lighting units.

According to another embodiment, audio processing unit 110 may be configured to detect and classify audio output at different locations within a vehicle. In certain embodiments, audio processing unit 110 may be configured to provide output signals to the audio bus 130 to drive the output of lighting units $120_{1-n}$ to provide light output.

According to one embodiment, lighting control unit 115 is configured to provide ambient mood lighting. In one embodiment, lighting control unit 115 is configured to store a plurality of preset mood settings. Each mood setting may provide a display of an associated color in the vehicle. By way of example, a mood setting may relate to lighting units 120$_{1-n}$ providing a steady and continuous color, such as red light, in the vehicle cabin. Alternatively, a preset mood setting may be to provide a combination of light colors, such as yellow and white light continuously. Three or more color displays may be provided. Mood settings may also be set to define the duration that a color or lighting element is activated, the rate of change, brightness, etc. In addition, the mood setting may define color output parameters for a plurality of lighting units 120$_{1-n}$ individually. According to one embodiment, lighting units 120$_{1-n}$ may be configured to provide one or more preset moods, such as concert, nightclub, laid-back, cosmic, etc. Lighting units 120$_{1-n}$ may be configured to provide one or more preset moods and color themes that may be selected or modified using a control unit or audio source 105. In one exemplary embodiment of audio playback, a nightclub mood may relate to controlling lighting units 120$_{1-n}$ to produce lighting effects with rapid variations in color, intensity and distribution of light utilizing vibrant color schemes. Alternatively, a laid-back mood may be configured to produce slow variations in lighting color while utilizing mild color schemes. One or more additional moods or configurations may be controlled to provide parameters for color change variation rate, color, intensity and light distribution to provide a plurality of mood presents.

According to one embodiment, lighting control unit 115 may be configured to determine a mood setting based on audio data received on audio bus 130. By way of a non-limiting example, audio data including a bass heavy output to speakers may signal a mood with lighting elements to be pulsed based on the rhythmic output of the audio source. Alternatively, audio output indicating non-music audio programming (e.g., news, broadcast, audio titles, etc.) may signal a continuous or oscillating output of one or more colors with a slower rate of change compared to the pulsed output format above. In other embodiments, one or more non-audio sources of information may be employed to modify moods or mood selection. By way of example, one or more of outside temperature, brightness (e.g., daytime vs. nighttime), vehicle speed, weather (e.g., rain, snow, fog, etc.) may be used to change or override a mood setting. In addition, one or more user commands may be detected and employed to change or modify output of lighting elements.

As will be described herein, lighting control unit 115 may be configured to control lighting units 120$_{1-n}$ to provide lighting (e.g., ambient, mood, etc.) within a vehicle compartment, such as the passenger cabin separate from vehicle safety or reading lights. By way of example, lighting units 120$_{1-n}$ may be each positioned in a different location of a vehicle. In addition, lighting units 120$_{1-n}$ may relate to different types of units. By way of example, vehicle 100 may include lighting units 120$_{1-n}$ for one or more of, and not limited to, a passenger door light, dashing board light, accent light, headliner light, speaker light, head rest light, console light, door sill light, under lighting of seats and consoles, etc. Lighting units 120$_{1-n}$ may be deployed in multiple locations of the vehicle. In some embodiments, lighting units 120$_{1-n}$ may be associated with the location of speaker units. In other embodiments, vehicle 100 may include lighting units 120$_{1-n}$ with speaker elements and separate from the speaker elements. As such, lighting units 120$_{1-n}$ may provide a source of ambient lighting within the vehicle. Lighting control may be provided by controlling one or more of the color, brightness, change cycle and activation of lighting elements.

Mood lighting and one or more preset configurations may provide a certain feel or ambiance. Mood lighting may be controlled to reflect a type of output of audio source. According to another embodiment, the lighting units 120$_{1-n}$ may be controlled to provide an indication, separate from and or in addition to one or more lighted displays of the vehicle. By way of example, lighting units 120$_{1-n}$ may be controlled to illuminate (e.g., light up, flash, color change, pulsate, etc.) when a vehicle event is detected. As used herein, vehicle events may relate to operation conditions or warnings associated with the vehicles operation and/or incoming communications.

The configuration in FIG. 1 for vehicle 100 is an exemplary representation according to one or more embodiments. In certain embodiments, vehicle 100 may include a lighting control unit 115 for each lighting panel. In other embodiments, vehicle 100 may include a lighting control unit to control multiple lighting elements on one or more lighting panels. It should also be appreciated that vehicle 100 may include one or more additional components not shown in FIG. 1.

Figure 2:
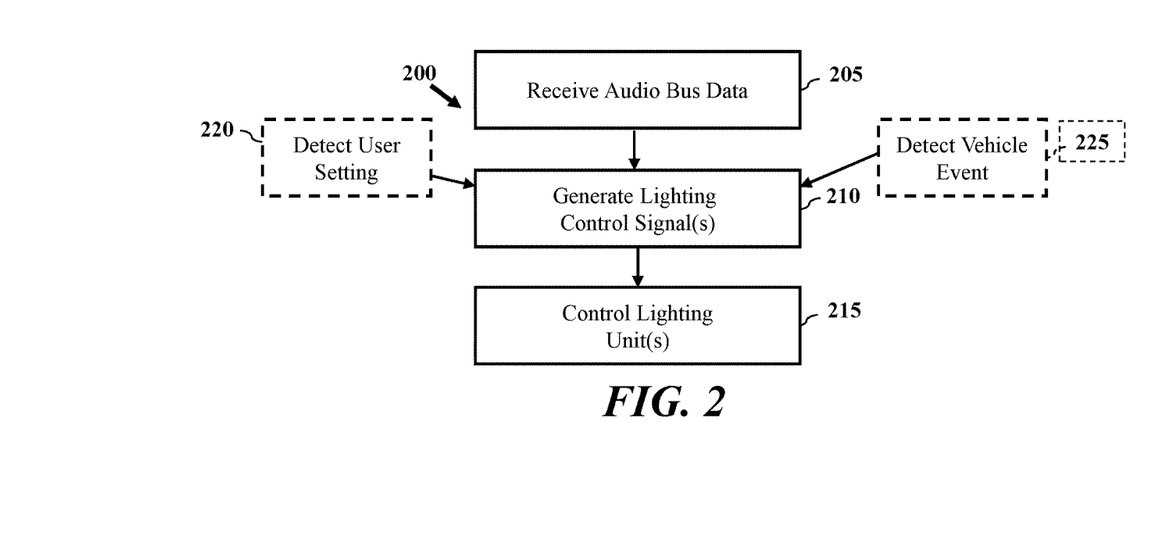
FIG. 2 depicts a process for lighting control by an audio bus lighting control device according to one or more embodiments.

FIG. 2 depicts a process for lighting control by an audio bus lighting control device according to one or more embodiments. Process 200 may be performed by a lighting control unit (e.g., lighting control unit 115 of FIG. 1). According to one embodiment, process 200 includes receiving audio bus data generated by a source in a vehicle at block 205, generating lighting control signals at block 210 and controlling one or more lighting elements at block 215. As will be discussed below, process 200 allows for providing a rich set of output configurations and control for multiple lighting elements in a vehicle. Process 200 may provide more than just activation of a set of lighting units. In addition to allowing for control using an audio bus, process 200 can account for at least one vehicle specific condition or event for control of lighting elements.

Process 200 may be initiated by receiving audio bus data generated by a source in a vehicle at block 205. In one embodiment, a lighting control unit (e.g., lighting control unit 115) receives audio bus data. According another embodiment, the lighting control unit includes a transceiver including one or more physical connections to the audio bus. In one embodiment, receiving audio bus data includes receiving time varying color information on at least one audio channel of the audio bus. By way of example, a signal encoding lighting parameters for each lighting element of the lighting unit including color, activation periods, brightness and color components (e.g., Red, Green, and Blue) may be encoded in a signal of the audio bus. In another embodiment, lighting controls may be transmitted on the audio bus to a controller using pulse width modification. In another embodiment, an indication of a present color mode is transmitted to the lighting controller. The audio bus data may provide audio data on one or more channels of the audio bus.

According to another embodiment, audio data includes an audio signal to be output to a speaker. The lighting control unit may receive the audio signal in either analog or encoded digital form on the audio bus and determine a lighting control setting based on the audio signal. By way of example, one or more of tempo, frequency response (e.g., heavy bass, dynamic range, higher pitch, etc.) may be used to generate lighting control signals.

At block 210, the lighting control device generates a lighting control signal for at least one lighting element of the vehicle based on the audio bus data. In one embodiment, the lighting control signal is generating to include pulse width modulated output signals for each of a red, green and blue output to the lighting panel. In one embodiment multiple sets of lighting control signals may be generated by a controller and provided to a switching circuitry. The switching circuitry may distribute the control signals to a plurality of lighting units.

In one embodiment, lighting control signals at block 210 are generated by the controller decoding the lighting control signals on the audio bus. The control information may be processed by the controller for outputting at least one color parameter for the lighting panel. In certain embodiments, generating the lighting control signal includes selecting a preset lighting setting associated with one of a plurality of mood settings. The preset light setting is selected in response to at least one of source type, audio class and audio sound profile.

At block 215, the lighting control device controls operation of the at least one lighting element of the vehicle based on the lighting control signal. In one embodiment, controlling operation includes controlling at least one of luminance, color, duration of illumination and rate of lighting element change for a lighting panel. According to another embodiment, controlling operation includes controlling operation of a plurality of lighting panels in association with at least one predefined mood setting. Control relates to one or more of color, brilliance, illuminance etc.

According to one embodiment, process 200 may optionally detect one or more user settings are block 220. In one embodiment, a user setting may include a selection of one or more of a mood setting, color, color set, and preset control by way of a user interface of an audio source. Based on the user setting, once or more lighting control signals may be generated at block 210.

According to another embodiment, a vehicle event may be optionally detected block 225. By detecting an event operation of the at least one lighting element of the vehicle may be updated. Vehicle events may relate to one or more of an incoming communication, vehicle shutdown, vehicle status indicator and change in source of audio bus data.

Figure 3:
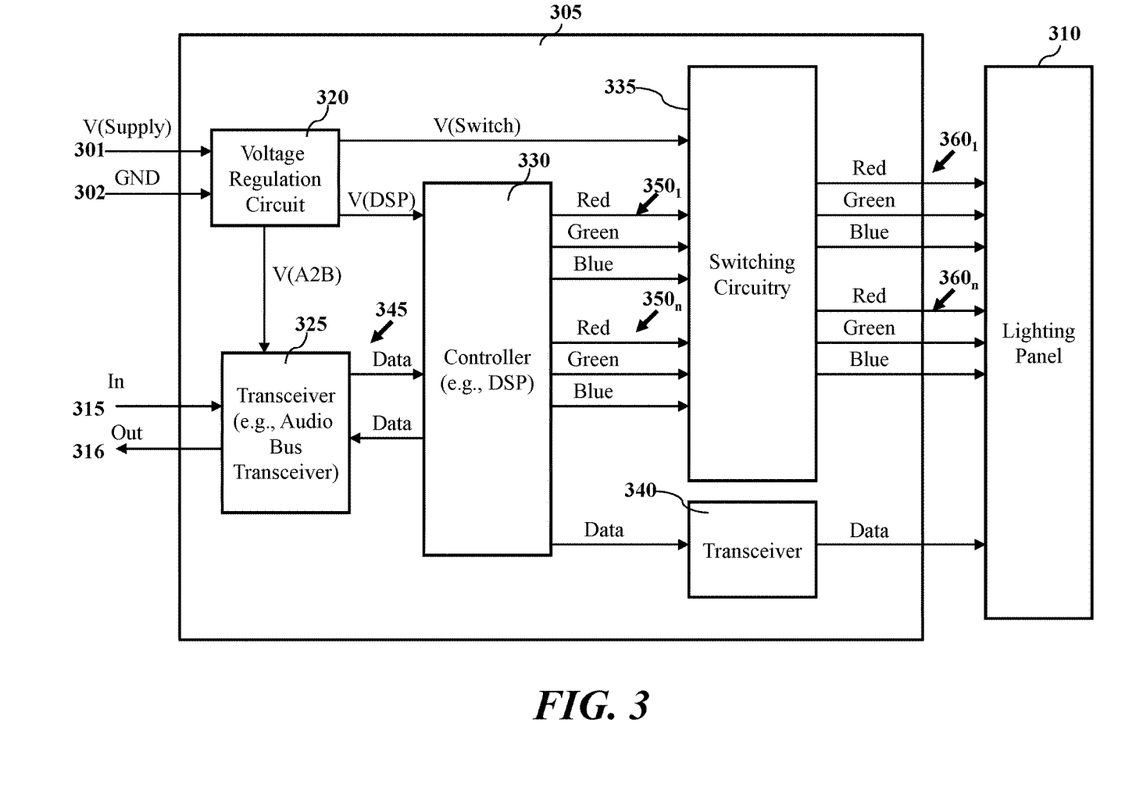
FIG. 3 depicts a graphical representation of an audio bus lighting control device according to one or more embodiments.

FIG. 3 depicts a graphical representation of an audio bus lighting control device according to one or more embodiments. Device 305 may be employed as a lighting control device (e.g., lighting control unit 115 of FIG. 1). According to one embodiment, device 305 may be configured to perform one or more processes and functions described herein, such as process 200 of FIG. 2 and process 600 of FIG. 6.

In an exemplary embodiment, device 305 includes one or more elements for interfacing with a vehicle and controlling lighting elements of the vehicle, such as lighting panel 310. According to one embodiment, device 305 includes a voltage regulation circuit 320 configured to vehicle voltage supply 301 and ground 302. Voltage regulation circuit 320 is configured to provide supply voltage to device 305 and components of device 305.

According to one embodiment, device 305 includes transceiver 325 configured to be coupled to a vehicle audio bus (e.g., audio bus 130). Transceiver 325 is configured to interface with input terminal 315 and output terminal 316 to the vehicles audio bus. According to one embodiment, transceiver 325 is an audio bus transceiver and can receive audio bus data generated by one or more sources in the vehicle. According to another embodiment, transceiver 325 may be configured to transmit one or more signals via output terminal 316 to an audio bus of a vehicle. Transceiver 325 is configured to transmit and receive audio data over multiple channels of a vehicle audio bus (e.g., audio bus 130) by way of input terminal 315 and output terminal 316. According to one embodiment, transceiver 325 is configured to receive and transmit control data to communicate on and/or off requests, lighting presets, and diagnostic requests to controller 330 from an audio processing unit, such as audio processing unit 110 of FIG. 1. Transceiver 325 may communicate active states and diagnostic information from controller 330 to one or more vehicle components, such as audio processing unit 110 of FIG. 1.

According to one embodiment, device 305 may include a controller 330 to control operation and direct one or more functions of device 305. Controller 330 is configured to receive audio bus data from transceiver 325, by way of bidirectional link 345. Audio bus data received by transceiver 325 may include one or more lighting control signals. As such, an audio processing unit (e.g., audio processing unit 110) may directly provide control signals to controller 330. In certain embodiments, controller 330 generates lighting control signals using audio bus data. Controller 330 may be a digital signal processor (DSP) configured to detect embedded data from one or more channels of the audio bus received on input terminal 315. According to one embodiment, controller 330 is configured to output lighting control signals $350_{1-n}$ to switching circuitry 335. Lighting control signals $350_{1-n}$ relate to pulse width modulated control signals including data for red, blue and green color spaces. According to one embodiment, lighting control signals $350_{1-n}$ include at least one set of color data, and may include multiple sets of color data such as nine (9) channels of color data (e.g., for three sets of red, green and blue color). According to another embodiment, lighting control signals $350_{1-n}$ can be configured based on surround sound conditions such as surround sound playback and one or more surround sound formats.

According to one embodiment, lighting control signals $350_{1-n}$ provide pulse width modulated data may be transmitted in an un-encoded form to directly drive one or more lighting panels, such as lighting panel 310. In other embodiments, lighting control signals $350_{1-n}$ may be output in an encoded format based on an end customer (i.e., vehicle manufacturer format) and/or decoding capabilities of the lighting panel used.

Switching circuitry 335 is configured to receive lighting control signals $350_{1-n}$ generated by controller 330 and generate light switching signals $360_{1-n}$ to lighting panel 310. According to one embodiment, lighting panel 310 represents one or more lighting elements. One or more of brightness, color, activation and output of lighting elements of lighting panel 310 may be controlled by light switching signals $360_{1-n}$. According to one embodiment, light switching signals $360_{1-n}$ may direct lighting panel to output one or more light configurations associated with a preset mood setting. According to another embodiment, light switching signals $360_{1-n}$ may be associated with one or more modes including but not limited to providing a light show for one or more of a concert, nightclub, laid-back, and cosmic mode. In one embodiment, lighting control signals $350_{1-n}$ may be output by controller 330 to switching circuitry 335 having voltage levels configured to drive one or more the lighting panels, such as lighting panel 310. The maximum current draw from controller output of lighting control signals $350_{1-n}$ may be lower than the nominal current draw of the lighting panels. In one embodiment, output, light switching signals $360_{1-n}$, of the switching circuitry 335 may be expected to switch between the appropriate voltages based on the controller output (lighting control signals $350_{1-n}$) and handle the current requirements of lighting panel 310.

According to one embodiment, device 305 includes transceiver 340 configured to interface with one or more lighting panels, including but not limited to lighting panel 310. Transceiver 340 is configured to receive lighting control data from controller 330. According to one embodiment, transceiver 340 may be configured to operate as a transceiver for a lighting controller bus (e.g., data output) to allow device 305 to interface with a plurality of lighting panels. In one embodiment, transceiver 340 may be configured to output lighting control signals that conform with a control protocol (e.g., DMX, etc.). As such, transceiver 340 can be configured to drive a plurality of linked lighting elements in a daisy chain configuration in addition to, or separate from, an audio bus. As will be discussed below in FIG. 7, one or more lighting control units and/or lighting panels may be linked in a daisy chain or connected configuration.

Figure 4:
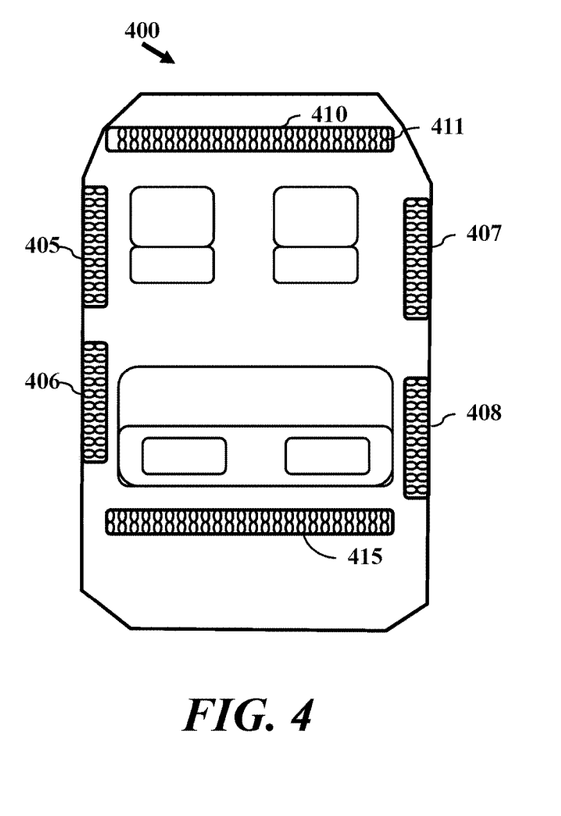
FIG. 4 depicts a graphical representation of a vehicle configuration according to one or more embodiments.

FIG. 4 depicts a graphical representation of a vehicle configuration according to one or more embodiments. According to one embodiment, vehicle 400 includes a plurality of lighting units, such as driver side light units 405-406, passenger side lights units 407-408, front light unit 410 and back light unit 415. As shown in FIG. 4, each lighting unit includes a plurality of lighting elements (e.g., LEDs, light sources, etc.) such as lighting element 411. According to another embodiment, a lighting control unit (e.g., lighting control unit 115 of FIG. 1, device 305 of FIG. 3, etc.) may be configured to individually control each lighting element of the lighting units of vehicle 400. Lighting units 405-406, 407-408, 410 and 415 may be attached to speaker grills or other locations within the cabin of vehicle 400.

According to another embodiment, operation of lighting units of vehicle 400 may be based on audio bus data associated with vehicle areas. By way of example, audio bus data may direct sound output only to a subsection of vehicle 400 (e.g., fade function to front or rear). As such, lighting control may including controlling lighting to only some of the lighting units, such as activation of lighting units in the rear of the vehicle based on vehicle settings to direct sound to rear speakers. Alternatively or in combination, color and light output of lighting elements may be different or reflect the audio equalization settings based on audio bus data. By way of example, based on settings in real time to a vehicle head unit to adjust bass, a lighting control unit of vehicle 400 may change the color settings and output of one or more lighting elements to signal changes to audio equalization. As such, lighting control is in response to user in According to one embodiment, one or more of the lighting elements may be controlled to signify a vehicle event. For an incoming communication, such as a telephone communication to a mobile device in the vehicle, one or more lighting elements may be controlled. In one embodiment, a vehicle event such as an incoming telephone communication may result in activation of front light unit 410. As such, front light unit 410 may be activated to pulse, provide a color different than other lighting units, or provide a light display to signal the incoming communication in the area of the passenger cabin associated with a particular passenger.

According to another embodiment, lighting elements of vehicle 400 may be controlled by way of an audio bus to reflect non-audio and non-speaker events and vehicle conditions. In one exemplary embodiment, an audio bus may provide control signals on one or more channels to direct lighting elements to output color based on vehicle settings. By way of example, driver side light unit 405 may be configured to emit a first color (e.g., blue light) to signal vehicle heating and cooling settings for the driver. Similarly, passenger side lights units 407 may be configured to emit a second color (e.g., red light) to signal vehicle heating and cooling settings for the driver. Color of the lighting elements may be controlled to signal a temperature setting. In addition, a third color could be output by one or more of passenger side lights units 407-408, and back light unit 415 to signify rear climate control settings. Other vehicle settings may be signaled by lighting elements that are not based on audio (e.g., sound) output using the audio bus, such as a color change or illumination on one side of the vehicle of lighting units 407-408 to signal a vehicle in close proximity. Vehicle events may be associated with audio cues generated to provide a warning to a vehicle operator such as blind spot detection, parking indicators, etc.

Figure 5:
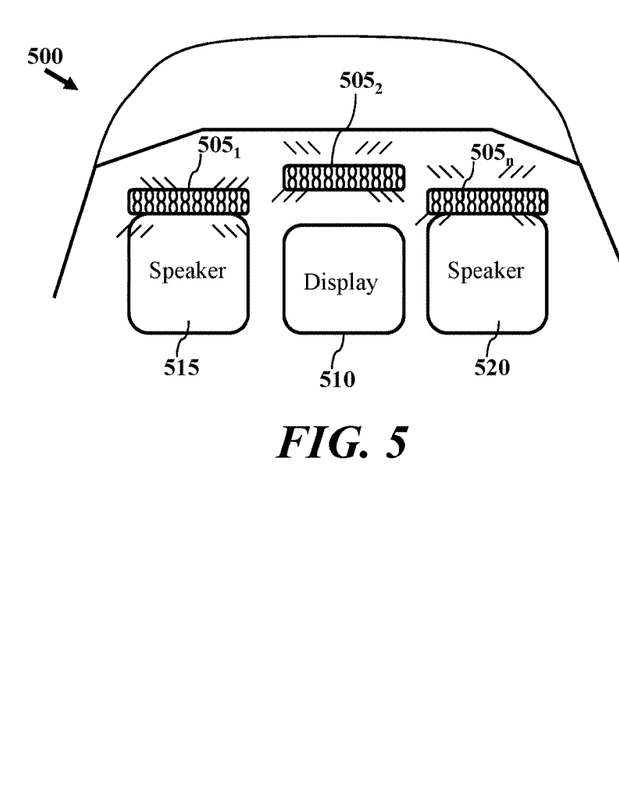
FIG. 5 depicts a graphical representation of a vehicle configuration according to one or more embodiments.

FIG. 5 depicts a graphical representation of a vehicle configuration according to one or more embodiments. According to one embodiment, vehicle 500 includes a passenger interface having a plurality of lighting units $505_{1-n}$ and a display unit 510. According to one embodiment, lighting units $505_{1-n}$ may be individually controlled. At least one of color, activation, luminance and output type (flashing, color wave, etc.) of lighting units $505_{1-n}$ may be controlled in response to one or more vehicle events. According to one exemplary embodiment, a plurality of lighting units $505_{1-n}$ may be grouped and located in a vehicle location, such as a vehicle console.

According to another embodiment, one or more lighting elements may be associated with vehicle speakers, such as speaker 515 and 520. FIG. 5 shows speaker 515 having lighting unit $505_1$, and speaker 520 having lighting unit $505_n$. According to one embodiment, lighting units $505_{1-n}$ may include lighting control units that interface with speakers 515 and 520. Display 510 may relate to a display of a head unit or audio source of vehicle 500. According to one embodiment, lighting units $505_{1-n}$ may provide backlighting and or mood lighting for display 510.

According to one embodiment, one or more lighting units of vehicle 500 may be configured to output light configurations associated with vehicle events. In an exemplary embodiment, one or more of lighting units $505_{1-n}$ of vehicle 500 may be configured to illuminate an emblem. For example, when the vehicle is turned on a manufacturer logo attached to the speaker grill could be illuminated by a lighting element, such as lighting unit $505_1$ and speaker 520. The colors and fade in effects of lighting unit $505_1$ in this example could be chosen based on the branding/marketing strategy. According to another exemplary embodiment, a lighting unit of vehicle 520, such as lighting unit $505_2$, may be placed in association with a vehicle storage element, such as a cup holder. One or more sensors of the vehicle storage compartment may report temperature (e.g., temperature within the cup holder) such that a lighting unit, lighting unit $505_1$ in this example, could illuminate with colors indicating temperature—for example blue to indicate cold, and red to indicate hot.

Figure 6:
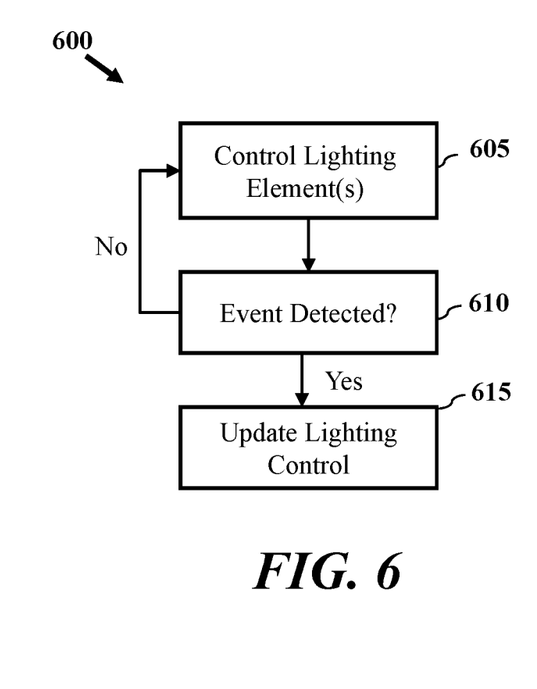
FIG. 6 depicts a process for lighting control according to one or more embodiments.

FIG. 6 depicts a process for lighting control according to one or more embodiments. Process 600 may be employed to allow for detection of vehicle events and updating of lighting control signals in response to detected events. Process 600 may be initiated by control of lighting elements at block 605, such as one or more light units of a vehicle. As discussed herein, control can include, but is not limited to, activation, performing a preset output display, and deactivation. Process 600 may include determining event detection at decision block 610. When no events are detected (e.g., "NO" block out of decisions block 610), process 600 continues to control lighting elements at block 605. Process 600 may be configured to update lighting control signals when an event is detected (e.g., "YES" block out of decisions block 610) at block 615. According to one embodiment, process 600 may generate welcome and goodbye sequences at block 605 in response to conditions detected at block 610, such as outputting a welcome display of lighting elements to a driver upon entering a vehicle, and a goodbye display of lighting elements when a vehicle is controlled to an off state.

In one embodiment, an event detected at block 610 can relate to an audio source change indicated by the head-unit. In another embodiment, an event detected at block 610 relates to lighting code changes by the end user to select a mode or mood (e.g., cosmic, nightclub, etc.). An event may relate to an audio track change (e.g., track stop, track seek, etc.) In yet another embodiment, an event detected at block 610 can relate to a multimedia system diagnostic status, such as a status indicator during setup, error detection, failure or operation for one or more of a headunit, amplifier, speaker, and vehicle unit. According to another embodiment, events detected at block 610 can relate to communications, such as an incoming phone call, message notification (e.g., text message, email, etc.).

In one embodiment, an event detected at block 610 can relate to vehicle drive unit status, such as engine on or off, accessory mode on or off, etc. According to another embodiment, an event at block 610 can relate to vehicle detection of a critical vehicle warning (park assistance, lane keep assistance, etc.). According to another embodiment, an event at block 610 can relate to in cabin temperature or cabin temperature settings.

According to another embodiment, an event detected at block 610 can relate to lighting control unit diagnostic requests, lighting control software re-flash requests, and/or detection of lighting panel failure. Environmental lighting conditions (e.g., daytime vs. nighttime) may also relate to events detected at block 610.

Figure 7:
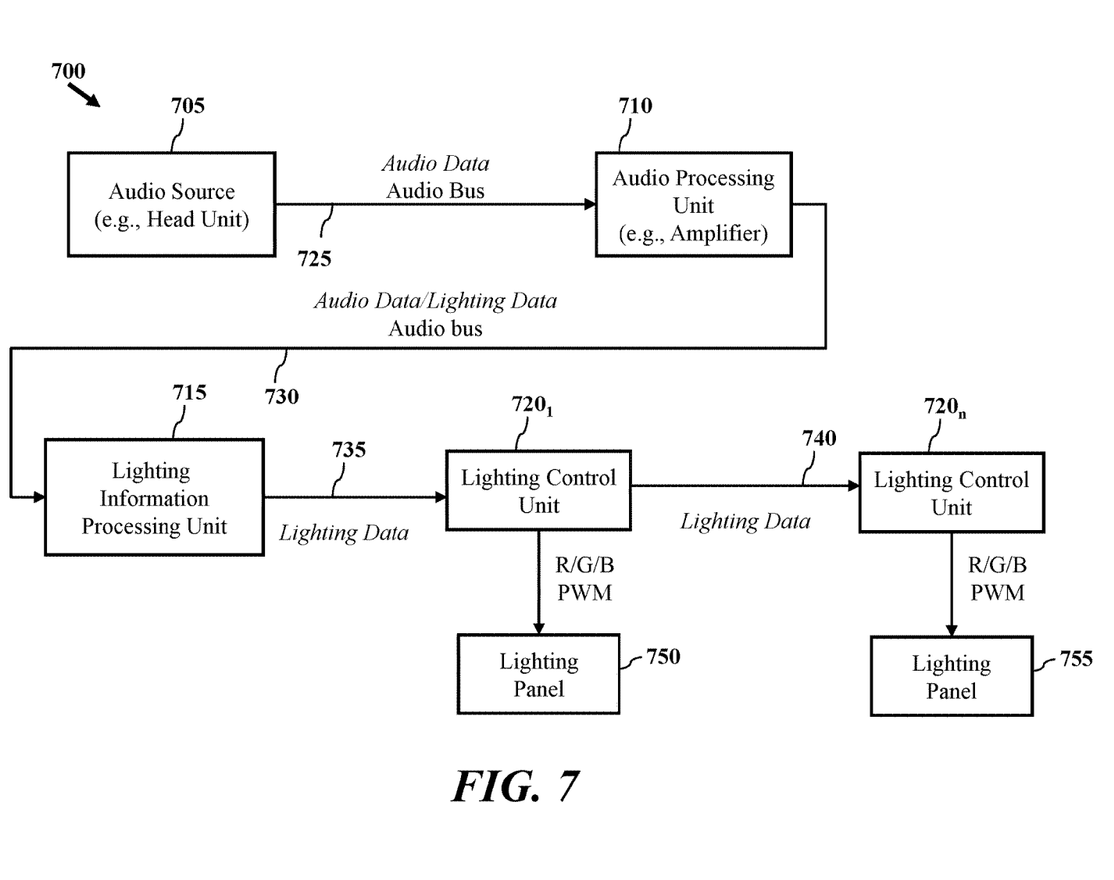
FIG. 7 depicts a lighting system configuration according to one or more embodiments.

FIG. 7 depicts a lighting system configuration according to one or more embodiments. FIG. 7 shows components of vehicle 700, such as an audio source 705, audio processing unit 710, lighting information processing unit 715 and lighting control units $720_{1-n}$. Audio source 705 and audio processing unit 710 may operate similar to audio source 105 and audio processing unit 110, of FIG. 1. As such, audio source 705 may be coupled to audio processing unit 710 by way of an audio bus 725 providing audio data. Lighting information processing unit 715 is coupled to audio processing unit 710 by an audio bus, audio bus 730 includes audio data and lighting data, which may relate to control data for one or more lighting panels.

According to another embodiment, processes and configurations described herein allow for lighting control of unit 715 to control one or more of lighting control units $720_{1-n}$ and lighting panels, such as lighting panels 750 and 755, based on audio bus data generated by a source in the vehicle, such as audio source 105, or output of an audio processing unit 710. According to one embodiment, lighting information processing unit 715 includes an audio bus transceiver (e.g., transceiver 325) and is configured to output address specific lighting schemes, shown as lighting data 735 and 740, to lighting control units $720_{1-n}$. According to another embodiment, lighting control units $720_{1-n}$ may be each be configured to drive one or more lighting panels, such as lighting panels 750 and 755. Instead of outputting a pulse width modulated output by lighting information processing unit 715 pulse width modulated outputs to drive lighting panels may be output by each of lighting control units $720_{1-n}$. According to one embodiment, lighting control units $720_{1-n}$ do not include audio bus transceivers but are configured to drive lighting panels. Lighting data 735 and 740 for lighting control units $720_{1-n}$ may be generated and/or routed by lighting information processing unit 715. According to one embodiment, lighting control units $720_{1-n}$ are arranged in a daisy chain configuration such that lighting data 735 is provided to lighting control units $720_1$ which may then provide lighting data 740 to lighting control units $720_n$. Lighting data may be provided to lighting control units $720_{1-n}$ and lighting panels 750 and 755 based on one or more addressing schemes specified by lighting information processing unit 715 which may be based on one or more protocols, such as a DMX protocol.

While this disclosure has been particularly shown and described with references to exemplary embodiments thereof, it will be understood by those skilled in the art that various changes in form and details may be made therein without departing from the scope of the claimed embodiments.

What is claimed is:

1. A method for lighting control by an audio bus lighting control device, the method comprising:
   receiving, by a lighting control device, audio bus data generated by a source in a vehicle, wherein receiving the audio bus data includes receiving at least one channel of an audio signal of the audio bus;
   generating, by a controller of the lighting control device, a lighting control signal for at least one lighting element of the vehicle based on the audio bus data; and
   controlling, by a switching unit of the lighting control device, operation of the at least one lighting element of the vehicle based on the lighting control signal.

2. The method of claim 1, wherein receiving the audio bus data includes receiving time varying color information on at least one audio channel of the audio bus.

3. The method of claim 1, wherein receiving the audio bus data includes receiving a signal encoding lighting parameters for each lighting element of a lighting unit.

4. The method of claim 1, wherein generating the lighting control signal includes generating pulse width modulated output signals for each of a red, green and blue output to the lighting panel.

5. The method of claim 1, wherein generating the lighting control signal includes decoding the lighting control signal and outputting control information for at least one color parameter for the lighting panel.

6. The method of claim 1, wherein generating the lighting control signal includes selecting a preset lighting setting associated with one of a plurality of mood settings, wherein the preset light setting is selected in response to at least one of source type, audio class and audio sound profile.

7. The method of claim 1, wherein controlling operation includes controlling at least one of luminance, color, duration of illumination and rate of lighting element change for a lighting panel.

8. The method of claim 1, wherein controlling operation includes controlling a plurality of lighting panels in association with at least one predefined mood setting.

9. The method of claim 1, further comprising detecting a vehicle event by the lighting control device and updating operation of the at least one lighting element of the vehicle based on the lighting control signal in response to the vehicle event.

10. The method of claim 9, wherein the vehicle event is at least one of an incoming communication, vehicle operating state, vehicle status indicator and change in source of audio bus data.

11. An audio bus lighting control device comprising:
an input;
an output; and
a control device coupled to the input and output, wherein the control device is configured to:
receive audio bus data generated by a source in a vehicle, wherein receiving the audio bus data includes receiving at least one channel of an audio signal of the audio bus;
generate a lighting control signal for at least one lighting element of the vehicle based on the audio bus data; and
control operation of the at least one lighting element of the vehicle based on the lighting control signal.

12. The device of claim 11, wherein receiving the audio bus data includes receiving time varying color information on at least one audio channel of the audio bus.

13. The device of claim 11, wherein receiving the audio bus data includes receiving a signal encoding lighting parameters for each lighting element of a lighting unit.

14. The device of claim 11, wherein generating the lighting control signal includes generating pulse width modulated output signals for each of a red, green and blue output to the lighting panel.

15. The device of claim 11, wherein generating the lighting control signal includes decoding the lighting control signal and outputting control information for at least one color parameter for the lighting panel.

16. The device of claim 11, wherein generating the lighting control signal includes selecting a preset lighting setting associated with one of a plurality of mood settings, wherein the preset light setting is selected in response to at least one of source type, audio class and audio sound profile.

17. The device of claim 11, wherein controlling operation includes controlling at least one of luminance, color, duration of illumination and rate of lighting element change for a lighting panel.

18. The device of claim 11, wherein controlling operation includes controlling a plurality of lighting panels in association with at least one predefined mood setting.

19. The device of claim 11, further comprising detecting a vehicle event by the lighting control device and updating operation of the at least one lighting element of the vehicle based on the lighting control signal in response to the vehicle event, wherein the vehicle event is at least one of an incoming communication, vehicle operating state, vehicle status indicator and change in source of audio bus data.

20. A system comprising:
at least one lighting unit; and
an audio bus lighting control device coupled to the lighting unit, wherein the audio bus lighting control device is configured to:
receive audio bus data generated by a source in a vehicle, wherein receiving the audio bus data includes receiving at least one channel of an audio signal of the audio bus;
generate a lighting control signal for at least one lighting element of the lighting unit in the vehicle based on the audio bus data; and
control operation of the at least one lighting unit of the vehicle based on the lighting control signal.

\* \* \* \* \*